United States Patent [19]

Sunde

[11] 4,227,085

[45] Oct. 7, 1980

[54] IONIZATION-TYPE PARTICLE DETECTOR

[75] Inventor: Paul B. Sunde, Northridge, Calif.

[73] Assignee: Electrometer Corporation, Cincinnati, Ohio

[21] Appl. No.: 948,803

[22] Filed: Oct. 5, 1978

[51] Int. Cl.[2] .................................................. G01T 1/18

[52] U.S. Cl. ...................................... 250/384; 250/385

[58] Field of Search ............... 250/381, 382, 384, 385; 340/579

[56] References Cited

U.S. PATENT DOCUMENTS

| | | | |
|---|---|---|---|
| 3,935,466 | 1/1976 | Tomioka | 250/385 |
| 4,150,373 | 4/1979 | Ried, Jr. | 250/381 |

*Primary Examiner*—Alfred E. Smith
*Assistant Examiner*—Janice A. Howell
*Attorney, Agent, or Firm*—Wood, Herron & Evans

[57] ABSTRACT

An ionization-type particle detector having an insulating base which mounts an inner electrode provided with a source of ionizing radiation which directs a generally conical beam perpendicularly away from the base; an intermediate cylindrical electrode symmetrically disposed around the inner electrode which has an open upper end through which the radiation beam exists from a compensation zone defined by the inner and intermediate electrodes; and an outer cup-shaped electrode symmetrically disposed about the intermediate electrode and which defines therewith a sensing zone into which radiation enters from the top opening in the intermediate electrode. The sensing zone is divided by the envelope of the radiation beam into an upper bipolar region and a lower unipolar region. The height and diameter of the intermediate electrode is selected relative to that of the outer electrode such that a decrease in ionization current between the intermediate and outer electrodes in the presence of smoke is attributable approximately 75% to a decrease in ionization flowing in the unipolar zone and approximately 25% to a decrease of current flowing in the bipolar zone. Slots in the outer electrode are configured such that air enters tangentially to avoid turbulence. The slots do not extend below a point equal to approximately the height of the intermediate electrode thereby blocking substantially the entirety of the compensation zone and approximately 50% of the unipolar region of the sensing zone from direct air flow paths via the slots. Full and partial blocking of the type described coupled with tangential air introduction enhances the insensitivity of the detector to variations in environmental air velocity.

3 Claims, 6 Drawing Figures

IONIZATION-TYPE PARTICLE DETECTOR

This invention relates to particle detectors and more particular particle detectors of the ionization type.

The majority of particle detectors can be categorized as either of the optical or ionization type. Optical detectors operate on the principle that smoke in the sensing zone thereof will affect, either increase or reduce depending upon the particular configuration, the amount of light incident on a phototransducer exposed to the sensing zone. Ionization type particle dectectors, on the other hand, operate on the principle that the presence of smoke in a sensing zone thereof subjected to ionizing radiation will reduce the current flowing between a pair of electrodes in the sensing zone across which a potential is maintained.

To reduce the probability of false alarms as a consequence of changes in the environment other than increases in particle density, it has been customary to provide the particle detectors with a second zone, called the compensation zone. The compensation zone is designed such that the parameter being measured (for example, light incident on a phototransducer in the case of an optical particle detector, or ionic current in the case of an ionization type detector) is effected by environmental changes other than changes in particle density. In this way, the output of the compensation zone can be utilized to compensate the output of the sensing zone for changes in the environment other than particle density changes, thereby avoiding false alarms due to changes in environment, such as pressure and the like, of a nature other than particle concentration.

This invention is directed to smoke detectors of the ionization type having compensating and sensing zones which has improved insensitivity to air flow velocity variations typically encountered in use by virtue of wind, air convection currents, and the like. Enhanced insensitivity to air velocity variations over a wide velocity range has been accomplished in accordance with certain principles of this invention by providing on an insulating mounting base (a) an inner electrode having a radioactive source of ionizing radiation which directs a generally conical radiation beam in a perpendicular direction away from the base, (b) an inner cylindrical electrode mounted with its axis generally concentric to that of the radiation beam and its outboard end open to allow the beam to pass outwardly therethrough, and (c) an outer cylindrical electrode surrounding the intermediate electrode and having its axis of symmetry substantially coincident with that of the intermediate electrode and radiation beam. The diameter and height of the intermediate electrode relative to that of the outer electrode are selected such that (a) the potential of a suitable source connected between the inner and outer electrodes is approximately equally divided between the compensation zone existing between the inner and intermediate electrodes and the sensing zone existing between the intermediate and outer electrodes, and (b) any decrease in ionic current between the intermediate and outer electrodes occasioned by smoke in the sensing zone is attributable approximately 75% to a decrease in current flowing in a unipolar region of the sensing zone and approximately 25% to a decrease of current flowing in a bipolar region of the sensing zone, the boundary between the unipolar and bipolar regions being established by the outer envelope of the conical radiation beam entering the sensing chamber from the open end of the intermediate electrode.

To further enhance the insensitivity of the dectector to variations in air velocity, air circulation slots formed in the cylindrical outer electrodes are oriented to permit air entering the sensing chamber to enter substantially only in a tangential direction, thereby minimizing turbulence within the sensing chamber. In addition, the lower extremity of the air circulation slots is at about the same height relative to the electrode mounting base as the open upper end of the intermediate electrode. This blocks substantially 100% of the composition zone and approximately 50% of the unipolar region of the sensing zone from direct air flow paths with the environment via the slots.

In accordance with a preferred embodiment of the invention, the air flow slots in the outer cylindrical electrode are formed by punching inwardly, at circumferentially spaced intervals, sections of the cylindrical wall of the outer electrode. This provides alternately circumferentially located inner and outer panels, with the spaces between confronting edges of adjacent pairs of inner and outer panels constituting the slots through which air enters the sensing chamber in the generally tangential direction. Since the inner panels have a width measured in a circumferential direction which is equal to the spacing between the outer panels, each inner panel subtends a larger angle than does the space between each of the outer panels. As a consequence, the inner panels intersect imaginary radial lines extending between the edges of the outer panels and the axis of symmetry of the sensing zone. Such intersection by the inner panels effectively precludes straight line exit radiation paths to the environment from the radiation source via the air circulation slots.

An advantage of this invention, in addition to the foregoing advantages, is that only a single radiation source is required for radiating both the compensation and the sensing chambers.

These and other features, objectives and advantages of the invention will become more readily apparent from a detailed description thereof taken in connection with the drawings in which.

Figure 1:
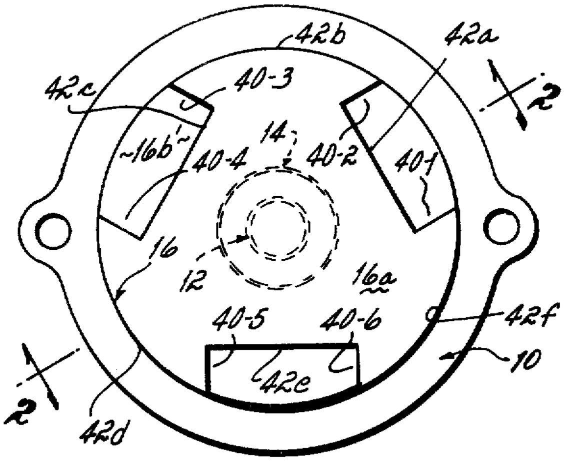
FIG. 1 is a top plan view of the particle detector.
Figure 3:
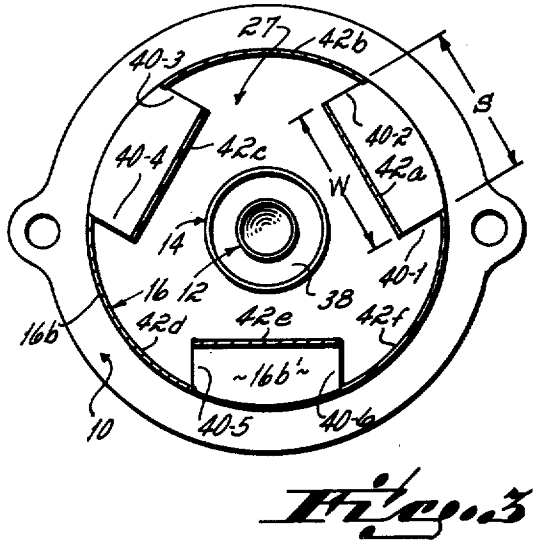
FIG. 3 is a cross sectional view taken along line 3—3 of FIG. 2.
Figure 2:
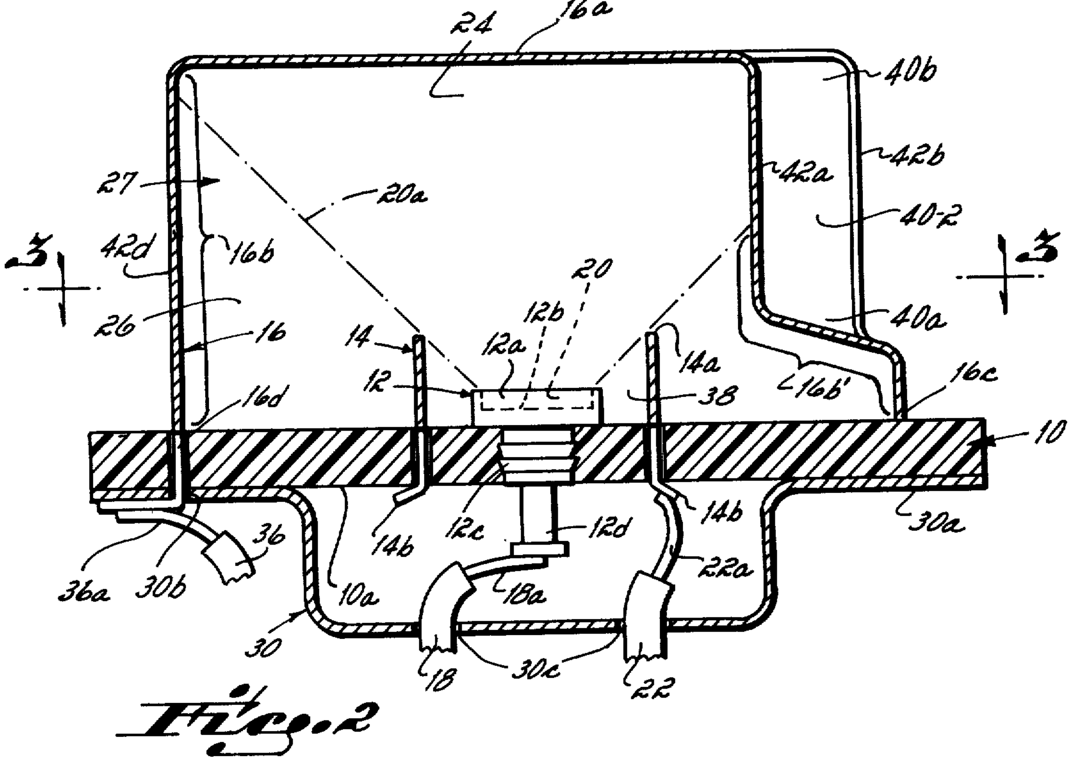
FIG. 2 is a front elevational view in cross section taken along line 2—2 of FIG. 1.

Referring particularly to FIG. 2, the particle detector of this invention is seen to include a generally flat circular mounting disc or base 10 to which are secured in operative relationship the various elements of the particle detector. The mounting base 10 is fabricated of electrically insulated material, such as high density polyethylene, which does not readily accumulate electrostatic charge. Supported on the insulative base 10 in a centrally disposed location is an inner electrode 12, an intermediate electrode 14 and an outer electrode 16.

The inner electrode 12 includes an enlarged circular head 12ahaving a recess 12b in the upper surface thereof, a peripherally grooved shank 12a which extends vertically downwardly from the head 12c, and a reduced diameter pin 12d which extends below the lower surface 10a of the base 10. The shank 12a frictionally engages a centrally located hole in the base 10, providing a simple, but secure, mount for the inner electrode 12 relative to the base 10. The pin 12d facilitates making an electrical connection to the inner electrode, such as by soldering thereto the bared end of 18a of an insulated conductor 18. The recess 12b formed on the upper surface of the head 12a provides a convenient receptacle for a radioactive source of ionizing radiation. In a preferred embodiment of this invention the radioactive source 20 consists of 0.5 microcuries of Americium 241 which emits alpha particles capable of ionizing air as well as some beta and gamma radiation. The radiation beam emitted by the source 20 is generally conical and for illustrative purposes is referenced with numeral 20a.

The intermediate electrode 12 is generally cylindrical in shape, having an upper circular edge 14a which defines an opening through which radiation from source 20 passes in a generally upwardly direction. Extending from the lower edge of the cylindrical intermediate electrode 14 are a pair of tabs 14b, 14b which pass through suitably located openings in the base 10. The tabs 14b are bent outwardly at a point below the lower surface 10a of the base to secure the intermediate electrode 14 in position on the base at a location symmetrically disposed in surrounding relationship to the inner electrode 12. The bared end 22a of an insulated conductor 22 can be soldered to one of the tabs 14b to establish an electrical connection to the intermediate electrode 14. The longitudinal axis of symmetry of the cylindrical intermediate electrode 14 is substantially coincident with the longitudinal axes of symmetry of the inner electrode 12 and the conical radiation beam 20a.

The outer electrode 16 is generally cup-shaped, having a flat generally circular disc-shaped top 16a and an integrally formed generally cylindrical section 16b. The longitudinal axis of symmetry of the cylindrical section 16b of the outer electrode 16 is generally coincident with the axes of symmetry of the radiation beam 20a and the intermediate electrode 14. The interior of the cylindrical section 16b of the outer electrode 16 includes an upper bipolar region 24 and a lower unipolar region 26 which collectively define a particle sensing zone 27. The boundary between the bipolar region 24 and the unipolar region 26 is generally defined by the conical envelope of the radiation beam 20a.

When an electrical potential is applied between the inner and outer electrodes 12 and 16 and positive and negative ions are produced in the interior of the cylindrical electrode by ionizing radiation from the source 20, both positive and negative ions are present in the bipolar region 24 while ions of only a single polarity are present in the unipolar region 26. Assuming the potential of the outer electrode 16 is positive with respect to the potential of the inner electrode 12, only negative ions are present in the unipolar region 26. These negative ions are electrostatically attracted toward the lower portion 16b' of the cylindrical section 16b of the outer electrode 16 lying between the lower circular edge 16c of the outer electrode and the point where the envelope of the beam 20a intersects the cylindrical section 16b. In the bipolar region 24 positive ions are attracted toward the intermediate electrode 14 which is typically maintained at a negative potential relative to the outer electrode 16, while negative ions are attracted toward the top 16a of the outer electrode 16 and that portion of the cylindrical section 16b of the cylindrical outer electrode lying between the top 16a and the point where the envelope of the beam 20a intersects the cylindrical section 16b.

Tabs 16d, which extend downwardly from the lower edge 16c of the cylindrical section 16b of outer electrode 16, pass through suitably provided openings formed in the base 10. A cup-shaped electrostatic shield 30 having a flaired lip 30a which seats against the lower surface 10a of the base 10 is provided with suitable openings 30b through which the tabs 16d of the outer electrode also pass. The tabs 16d are bent to secure the outer electrode 16 and the electrostatic shield 30 in position on the base 10. A suitable electrical connection to the outer electrode 16 is made, for example, by soldering the bared end 36a of an insulated conductor 36 to one of the tabs 16d. The electrostatic shield 30 is provided with openings 30c through which conductors 18 and 22 pass for connection to the negative terminal of a source of potential, such as a battery 32, and the input of an amplifier 34 shown in FIG. 4. The positive terminal of the battery 32 is connected to the cylindrical electrode 16 by the conductor 36.

Figure 4:
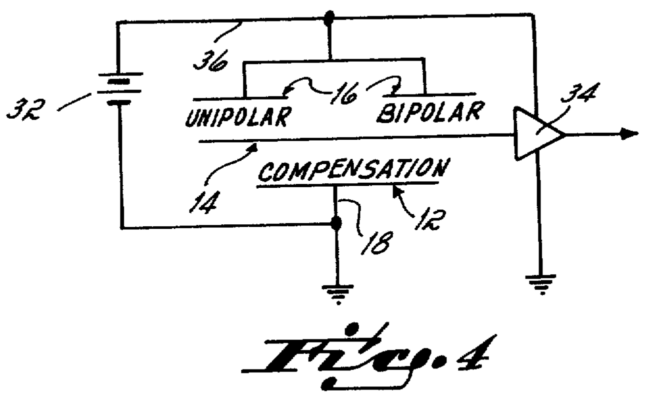
FIG. 4 is a simplified schematic diagram of a particle sensing circuit incorporating the particle detector of this invention.

The region 38 between the inner electrode 12 and the intermediate electrode 14, which is known as a compensation zone, contains a very high density of positive and negative ions. As a consequence, the ion current between the inner electrode 12 and intermediate electrode 14 is saturated and relatively unaffected by the presence of particles. By way of contrast, the bipolar and unipolar regions 24 and 26 have a significantly lower ion concentration and hence the presence of particles in these regions has a measurable affect on the ion current level flowing between the intermediate electrode 14 and the outer electrode 16. A change in the ion current level flowing between the intermediate and outer electrodes 14 and 16 can be used to detect the presence of particles in the environment being monitored in which the particle detector is located. The circuit of FIG. 4 is a typical arrangement used to facilitate such particle detection when compensation and sensing zones are employed. While the ion current flow in the compensation zone 38 between the inner and intermediate electrodes 12 and 14 is relatively unaffected by the presence of particles, it is affected by environmental changes other than a change in particle density such as pressure, density of air molecules, and the like. Since changes in the environment other than the concentration of particles affect the ion current flow between the intermediate electrode and the outer electrodes 14 and 16, the compensation zone 38 and its associated inner and intermediate electrodes 12 and 14 constitute a method of compensating the particle detector for changes in the environment (other than particle concentration) such that false alarms caused by enviromental changes (other than particle concentration) do not occur.

To facilitate the flow of environmental air through the unipolar and bipolar regions 24 and 26 for particle detection purposes and to facilitate communication between the compensation zone 38 and the environment for compensation purposes, a plurality of slots 40-1, 40-2, . . . 40-6 are provided which are generally elongated with the longitudinal axis of each parallel to the generally coincident longitudinal axes of symmetry of the beam 20 and intermediate and outer electrodes 14 and 16. The lower extremity 40a of each of the slots 40-1, 40-2, . . . 40-6 is at a height above the upper surface 10e of the base 10 which is substantially the same as the height of the circular edge 14a of the intermediate electrode 14. Stated differently, the lower extremity 40a of the slots 40-1, 40-2, . . . 40-6 and the circular edge 14a of the intermediate electrode 14 lie in substantially the same plane. With the lower extremity 40a of the slots 40-1, 40-2, . . . 40-6 so located relative to the upper edge 14a of the intermediate electrode 14, the compensation zone 38 is substantially fully protected against air currents flowing directly into the compensation zone 38 from the environment via the air circulation slots. The upper extremity 40b of the slots 40-1, 40-2, . . . 40-6 is located proximate to the top 16a of the outer electrode 16.

Separating the slots 40-1, 40-2, . . . 40-6 are inner panels 42a, 42c, and 42e which alternate with outer panels 42b, 42d, and 42f. The width W of the inner panels 42a, 42c, and 42e measured in a circumferential direction is approximately equal to the spacing S measured in a circumferential direction between the confronting vertical edges of adjacent pairs of outer panels located on opposite sides of the slots S. By reason of the approximate equality of the width W of the inner panels 42a, 42c, and 42e and the spacing S between the outer panels which define the slots and the fact that the inner panels are located closer to the axis of symmetry of the detector than the outer panels, the inner panels prevent radially directed air flow into the unipolar and bipolar regions 26 and 24 via the slot S. Instead, air flow into the unipolar and bipolar region 26 and 24 via the slots 40-1, 40-2, . . . 40-6 is in a generally tangential direction. This reduces turbulence within the unipolar and bipolar regions 26 and 24 which collectively constitute the particle sensing zone 27 of the detector.

The height and diameter of the intermediate electrode 14, which to a large extent determines the configuration of the envelope of the radiation beam 20a, are selected relative to the height and diameters of the inner and outer panels of the outer electrodes such that (a) the potential of the battery 32 is approximately equally divided between the compensation and sensing zones and (b) any ionization current decrease due to smoke in the sensing zone 27 is apportioned such that the ion current decrease in the unipolar region 26 exceeds the ion current decrease in the bipolar region 24 by a factor of approximately 3. Stated differently, the height and diameter of the intermediate electrode 14 relative to the height and diameter of the outer electrode 16, particularly the cylindrical section 16b thereof, is selected such that (a) under normal conditions, i.e., absent smoke, the voltage between the inner and intermediate electrodes 12 and 14 is approximately equal to the voltage between the intermediate and outer electrodes 14 and 16, and (b) any decrease in ion current in the sensing zone 27 between the intermediate and outer electrodes 14 and 16 occasioned by the presence of smoke is attributable approximately 75% to a decrease in ion current flow between the intermediate electrode and that portion of the outer electrode bounding the unipolar region 26 and 25% to a decrease in ion current flow between the intermediate electrode and that portion of the outer electrode bounding the bipolar zone 24.

Figure 5:
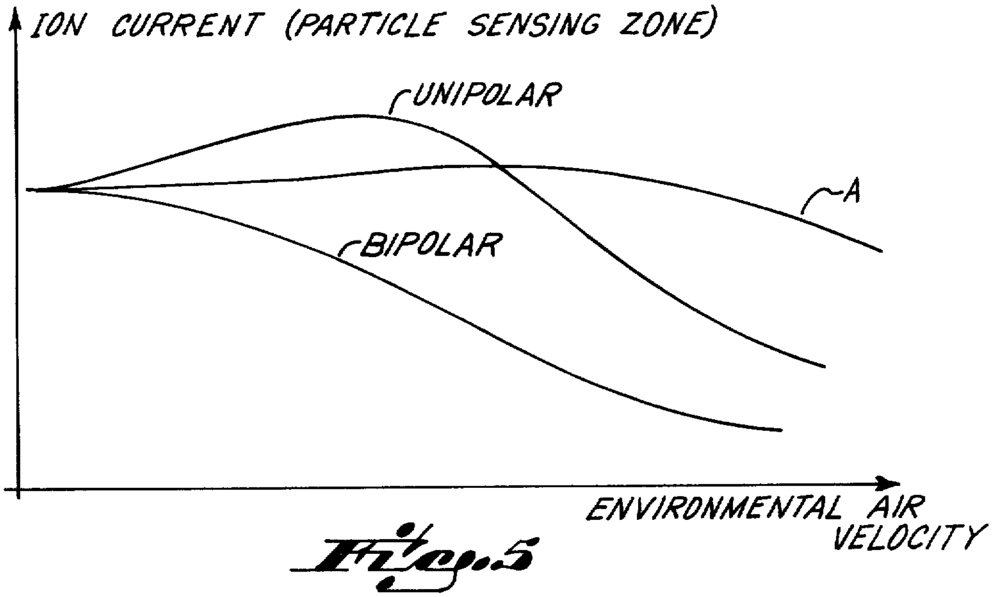
FIG. 5 is a plot of ion current in the particle sensing zone versus air velocity for the particle detector of this invention which exhibits unipolar and bipolar characteristics, along with similar plots for particle sensing zones which are either exclusively bipolar or unipolar.

With the height and diameter of the intermediate electrode relative to that of the outer electrode selected as described above, the insensitivity of the smoke detector to changes in environmental air velocity is enhanced. As such, the detector is not prone to false alarms by virtue of sudden changes in air velocity due to wind, convection, or the like. It has been found that for air velocities of up to approximately 300 feet per minute, the response of the detector of this invention is relatively uniform, as shown in FIG. 5, which is a plot of ion current in the sensing zone 27 between the intermediate and outer electrodes 14 and 16 versus air velocity for air of constant particle density. With reference to FIG. 5, note that the response characteristic A for the detector of this invention having a sensing zone with both unipolar and bipolar regions is flatter over a broader range than is the case for detectors having sensing zones which are substantially either entirely unipolar or bipolar.

By virtue of locating the lower extremities 40a of the air circulation slots at substantially the same elevation as the upper edge 14a of the intermediate electrode 14, only approximately 50% of the unipolar region 26 of the sensing zone 27 is in direct communication with the environment via the slots. As a consequence, the unipolar region 26, which is more sensitive to the presence of smoke than the bipolar region, has lesser direct exposure to the environment via the slots than the bipolar region 24, with the result that the insensitivity of the detector to the effect of wind, air currents, and the like is further enhanced. The insensitivity of the detector to wind is still further enhanced by the tangential introduction into the sensing zone 27 of environmental air produced by the slot configuration hereinabove described.

The voltage of the battery 32 applied between the inner and outer electrodes 12 and 16 is not critical, but must be sufficient to generate ion current flow above the noise level. In practice, with a noise level of approximately 3 picoamperes, the battery potential 32 should be selected such that a current of 15–19 picoamperes exists between the inner and outer electrodes 12 and 16 under normal conditions, i.e., absent smoke. Obviously, as the diameter of the outer electrode 16 is increased to increase the distance between the inner and outer electrodes 12 and 16, the potential applied therebetween must be increased to achieve the desired current flow of 16–19 picoamperes between the inner and outer electrodes under normal conditions.

By virtue of the fact that the width W of the inner panels 42a, 42c, 42e is approximately equal to the spacing S between the outer panels 42b, 42d, 42f and straight line paths do not exist between the axes of symmetry of the detector and the confronting edges of adjacent panels which define the slot S, straight line paths from the radiation source 20 to the environment do not exist, thereby minimizing safety hazards due to stray radiation from source 20 escaping into the environment from the sensing zone 27. Also, electrostatic shielding of the ion column in zone 27 is enhanced.

Another advantage of this invention is that only a single radiation source is required for irradiating both the compensation and sensing zones. This is attributable to the fact that the intermediate electrode, within which the source 20 is disposed for axial emission, is located concentrically within the outer electrode.

In one preferred embodiment of the invention utilizing an outer electrode 16 having a diameter of 3.7 centimeters and a height of 1.5 centimeters, and an intermediate electrode 14 measuring one centimeter in diameter and 0.4 centimeters in height, a battery of 9 volts connected between the inner and outer electrode 12 and 16 was found to provide approximately 4.5 volts between the inner and intermediate electrodes 12 and 14 and approximately 4.5 volts between the intermediate and outer electrodes 14 and 16 with the current level between the inner and outer electrodes 12 and 16 comfortably above the noise level.

Figure 6:
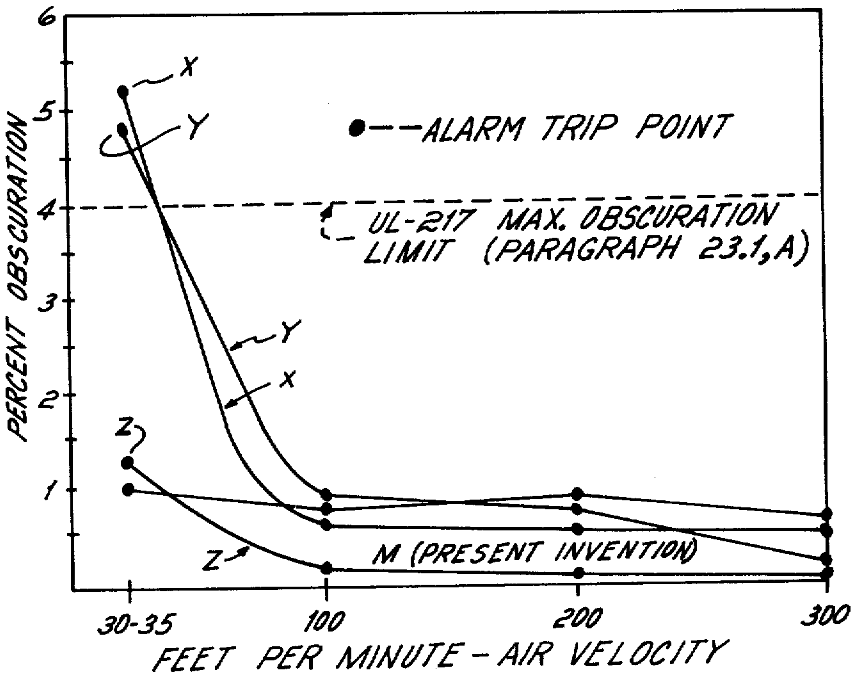
FIG. 6 is a plot of the percent obscuration at which alarm tripping occurs versus air velocity for the particle detector of this invention, as well as three commercially available ionization type particles detectors.

To further illustrate the insensitivity of the particle detector of this invention to air velocity, reference is directed to FIG. 6 which is a plot of percent obscuration at which the alarm trips versus air velocity for the particle detector of this invention. As apparent from curve M of the plot of FIG. 6, the particle detector of this invention tripped, that is, went into an alarm condition, in the narrow range of 0.7–1.0 percent obscuration for air velocities varying between 30 feet per minute and 300 feet per minute. Moreover, the time required to reach an alarm condition over the range of air velocities noted for the detector of this invention spanned a narrow region of 1:05 minutes to 1:40 minutes with a variation of only 35 seconds. Plots X, Y and Z graphically show the response of commercially available particle detectors of other ion chamber configurations tested under conditions identical to the particle detector of this invention. Significantly, at 30 feet per minute air velocity detectors X and Y tripped at 5.2 and 4.8 percent obscuration, respectively, which is above the maximum obscuration limit permitted by Underwriters Laboratory specification UL-217 which requires that at the 30 feet per minute air velocity the particle detector must trip at 4 percent or less obscuration. Also of significance is the fact that detectors X, Y, and Z show substantial nonlinearity in percentage obscuration required for tripping over the range of air velocities tested. In addition, the time to alarm for detector X varied between 1:36 minutes and 10:25 minutes (8:49 minute variation); detector Y varied between 9:50 minutes and 1:20 minutes (variation of 8:30 minutes); and detector Z varied between 3:10 minutes and 0:22 minutes (variation of 2:58 minutes). In comparison with similar data for the detector of this invention, it is clear that the detector of this invention had a maximum tripping time to alarm substantially less than any of the others. In addition, the variation in time to alarm as the air velocity is varied is a mere fraction of that for the other detectors.

Another advantage of the particle detector of this invention, particularly by reason of surrounding the source with an open top cylindrical intermediate electrode, is that the envelope **20*a* of the beam in the sensing zone is substantially conical in shape, that is, the angle 45 between the axis of symmetry of the beam and the beam envelope 20*a* is substantially constant in magnitude throughout 360° rotation about the axis of beam symmetry. This result is produced by reason of the fact that the upper portion of the cylindrical intermediate electrode 14 intersects the beam eminating from the source 20, thereby shaping the beam as it enters the sensing chamber. In practice, and without an envelope-shaping intermediate electrode, such as electrode 14** disposed symmetrically about the source with its axis of symmetry symmetric to the beam axis, it has been found that the envelope of the beam is not perfectly conical, but rather is such that as the angle of extinction, which in the context of the detector of this invention is angle 45°, varies ±5° throughout 360° rotation about the axis of symmetry of the beam.

What is claimed is:

1. An ionization-type particle detector comprising:
an inner electrode,
a single radioactive source of ionizing radiation mounted proximate said inner electrode for directing a generally conical beam of ionizing radiation along a predetermined axis of symmetry, said beam having an envelope,
a generally cylindrical outer electrode symmetrically disposed about said inner electrode, said outer electrode having a longitudinal axis of symmetry substantially conincident with said predetermined axis of symmetry of said beam, said outer electrode having an opening therein communicating with the environment through which particles enter from the environment,
a source of potential connected between said inner and outer electrode,
a generally cylindrical intermediate electrode disposed symmetrically about said inner electrode to define therebetween a compensation zone having a substantially saturated ion current which is substantially unaffected by changes in particle concentration therein, said intermediate electrode being generally concentric to said outer electrode to define therebetween a particle sensing zone having an unsaturated ion current which decreases with increasing particle density therein, said intermediate electrode having an opening in the top thereof co-extensive in area to the cross-sectional area of said intermediate cylindrical electrode, said opening being defined by an upper circular edge through which radiation from said source is emitted with the envelope of said beam dividing said sensing zone into an upper bipolar region interiorly of said beam and a lower unipolar region exteriorly of said beam, said intermediate and outer electrodes having diameters and heights designed relative to each other to approximately equally divide the potential of said source between said compensation and sensing zones and produce, in response to an increase in particles in said sensing zone, an ionization current decrease in said unipolar region which exceeds the ionization current decrease in said bipolar region by a factor of approximately three, thereby providing enhanced insensitivity of the detector to variations in environmental air velocity.

2. The smoke detector of claim 1 wherein said opening comprises a plurality of circumferentially spaced slots disposed generally parallel to said longitudinal axis of said outer electrode, said slots each having a lower extremity, said lower extremities of said slots and said upper edge of said intermediate electrode lying in approximately the same plane to shield approximately 100% of said compensation zone and approximately 50% of said unipolar zone from direct environmental air flow through said slots, said slots each having an upper extremity lying in a plane passing through an upper portion of said bipolar region to place substantially the entire bipolar region in direct communication with said environment via said slots.

3. The smoke detector of claim 2 wherein said outer electrode has alternating inner and outer panels with adjacent panels being separated from each other by different ones of said slots, said inner panels being disposed radially inwardly relative to said outer panels, said inner panels each having a width measured in a circumferential direction which approximates the circumferential spacing between adjacent edges of the associated pair of outer panels on either side thereof to cause said inner panels to intersect imaginary radial lines passing through said edges of said outer panels and thereby preclude radially directed air flow paths through said slots into said unipolar and bipolar regions, and further preclude exit of radiation directly from said source via said slots along a straight path between said source and slots as well as electrostatically shield ions in said sensing zone.

* * * * *